G. COOK.
FISHING REEL.
APPLICATION FILED APR. 17, 1917.
1,240,677.
Patented Sept. 18, 1917.
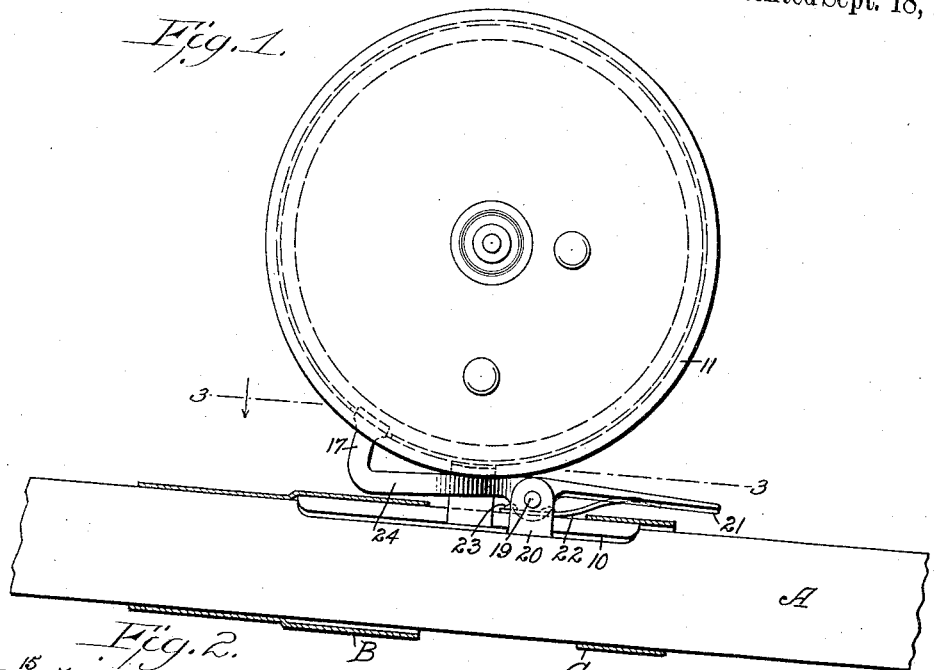
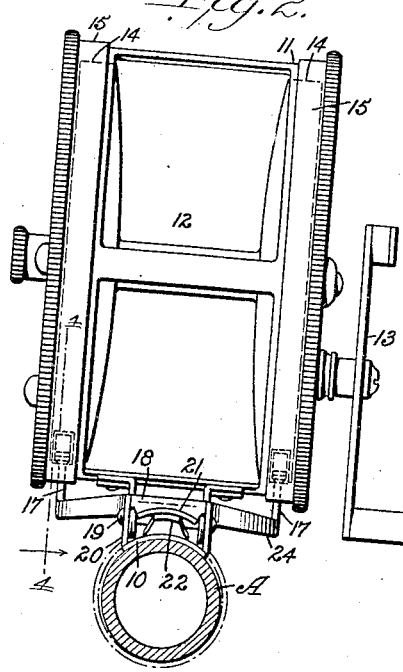
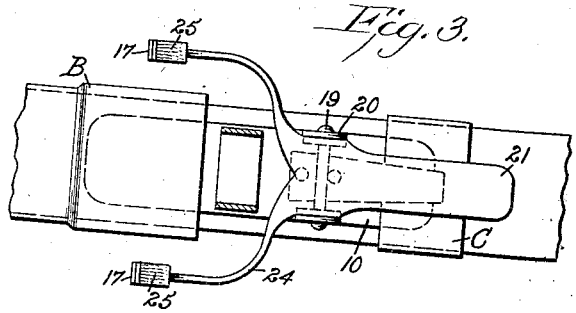
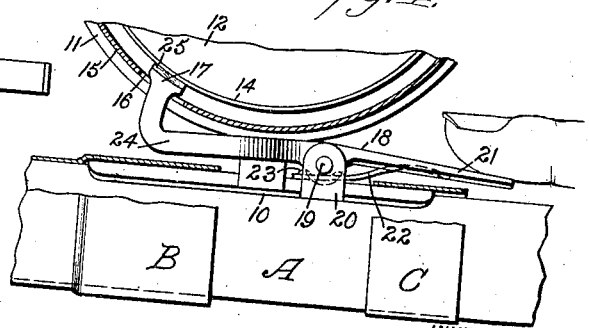
WITNESSES
INVENTOR
Gustav Cook
BY
ATTORNEYS

UNITED STATES PATENT OFFICE.

GUSTAV COOK, OF GILLETT, WISCONSIN.

FISHING-REEL.

1,240,677.  Specification of Letters Patent.  Patented Sept. 18, 1917.

Application filed April 17, 1917. Serial No. 162,609.

*To all whom it may concern:*

Be it known that I, GUSTAV COOK, a citizen of the United States, and a resident of Gillett, in the county of Oconto and State of Wisconsin, have invented a new and Improved Fishing-Reel, of which the following is a full, clear, and exact description.

My invention has for an object to provide a reel having improved brake means designed to give better control to the reel while permitting a brake to be applied thereto with varying pressure. The invention is characterized by a brake pivotally mounted on the reel beneath the casing and spool and acted upon by a spring normally holding the brake in release position. In the preferred form the brake is forked and presents a pair of brake shoes to engage the reel at each side. Brake flanges are provided on the reel at each side to be engaged by the shoes, and the casing is provided with annular flanges extending laterally inward toward each other outside of the brake flanges to house the latter, there being openings in the housing flanges accommodating the movements of the brake.

The nature of the invention and its advantages will more clearly appear as the description proceeds.

Reference is to be had to the accompanying drawings forming a part of this specification in which similar reference characters indicate corresponding parts in all the views.

Figure 1 is a side elevation of a reel equipped with a brake embodying my invention, showing the same mounted on a rod, the usual reel securing means being in section;

Fig. 2 is a rear end view thereof, the fishing rod being in section;

Fig. 3 is a sectional plan view on the line 3—3, Fig. 1;

Fig. 4 is a fragmentary view in sectional side elevation.

The letter A indicates a portion of a fishing rod, B, the usual socket for one end of the base 10 of the reel, and C, the usual sliding clamp ring to engage the opposite end of the base. The numeral 11 indicates the reel casing mounted on the base in any suitable manner, and 12 indicates the spool to be turned by a crank handle 13 as usual.

In carrying out my invention the spool 12 is formed with annular outwardly extending brake flanges 14, there being a flange at each side within the sides of the casing 11. Annular flanges 15 are formed on the sides of the casing 11 extending laterally inward toward each other radially outward of the brake flanges 14, to house said brake flanges. In each housing flange 15 an opening 16 is produced at the outer side to accommodate the movements of upwardly extending brake members 17 to engage the brake flanges 14, said members being formed on a vertically rocking brake 18 disposed between the casing 11 and the base 10 of the reel and pivoted in any suitable manner as by a pin 19 extending through vertical bearing lugs 20 on the base 10. At one side of the pivot the brake 18 has a thumb plate 21 which is pressed upwardly by any suitable spring 22, there being a plate spring shown in the illustrated example riveted at one end to the base as at 23 and bearing at its rear end against the thumb plate. Forward of the pivot the brake is forked presenting side arms 24 with which the members 17 are integral. Suitable brake shoes 25 of leather or the like are provided on the member 17 to frictionally engage the brake flanges 14.

The spring 22, it will be seen, normally maintains the brake out of action so that the thumb of the operator, as indicated in Fig. 4, by engaging the plate 21, may readily control the reel to arrest the same or to exert a drag thereon.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim as new, and desire to secure by Letters Patent:

1. A reel and brake therefor including a base, a casing thereon, a spool turning in the casing, annular brake flanges on the spool at the sides extending laterally outward, annular flanges on the sides of the casing extending laterally inward toward each other and disposed outside of the brake flanges to house the latter, said housing flanges having radial openings therein at the under side, a vertically rocking brake pivoted between its ends to the base, the rear end of the brake presenting a thumb plate, a spring acting on the thumb plate to raise the same, the forward end of the brake being forked presenting side arms terminating in upwardly extending members extending directly through the radial openings in the housing flange and provided with brake shoes to bear against the said brake flanges.

2. The combination of a reel having an annular brake flange on the spool thereof, an annular flange on the reel casing outside of the brake flange and housing the latter, said housing flange presenting an opening at the under side extending radially therein, and a spring-pressed brake on the reel at the under side and vertically rockable, said brake presenting a member accommodated in the said radial opening and extending directly therethrough and provided with a brake shoe to bear on the brake flange.

GUSTAV COOK.

Copies of this patent may be obtained for five cents each, by addressing the "Commissioner of Patents, Washington, D. C."